United States Patent [19]

Ziegler, II et al.

[11] 4,380,812

[45] Apr. 19, 1983

[54] REFRESH AND ERROR DETECTION AND CORRECTION TECHNIQUE FOR A DATA PROCESSING SYSTEM

[75] Inventors: Michael L. Ziegler, II, Whitinsville; Michael B. Druke, Chelmsford, both of Mass.; John R. Van Roekel, Ann Arbor, Mich.; Ward Baxter, II, Carlisle, Mass.

[73] Assignee: Data General Corporation, Westboro, Mass.

[21] Appl. No.: 143,675

[22] Filed: Apr. 25, 1980

[51] Int. Cl.³ .................... G06F 11/10; G11C 29/00
[52] U.S. Cl. ........................................ 371/38; 371/13
[58] Field of Search ............... 371/38, 39, 37, 40, 371/13

[56] References Cited
U.S. PATENT DOCUMENTS

| | | | |
|---|---|---|---|
| 4,112,513 | 9/1978 | Elsner | 365/222 |
| 4,175,692 | 11/1979 | Watanabe | 371/38 |
| 4,183,096 | 1/1980 | Cenker et al. | 371/13 |
| 4,216,541 | 8/1980 | Clover et al. | 371/38 |
| 4,251,863 | 2/1981 | Rothenberger | 371/38 |
| 4,255,808 | 3/1981 | Schaber | 371/38 |
| 4,319,356 | 3/1982 | Kocol et al. | 371/38 |

OTHER PUBLICATIONS

Christensen and Pattin, Jr., Stuck-Track Error Correction, IBM Technical Disclosure Bulletin, vol. 13, No. 7, Dec. 1970, pp. 1844-1846.

*Primary Examiner*—Charles E. Atkinson
*Attorney, Agent, or Firm*—Robert F. O'Connell

[57] ABSTRACT

A data processing system in which the bits of each stored word in a memory thereof are refreshed periodically. At substantially the same time the refresh operation with respect to each word occurs, an error detection operation also occurs and, if an error is detected in a word that is being refreshed, the error is then corrected and the corrected word is written back into the memory. Thus, errors are continuously being checked with no more use of machine time then is required for the refresh operation. Error correction, when necessary, then takes place at a fixed frequency, a limit thereby being placed on the error correction process. If errors in a work are detected when the word is requested for access by a requestor, the error is corrected before the word is supplied to the requestor but the corrected word is not written back into memory at that time, the word in memory being again detected and corrected at its next refresh operation.

6 Claims, 4 Drawing Figures

REFRESH AND ERROR DETECTION AND CORRECTION TECHNIQUE FOR A DATA PROCESSING SYSTEM

INTRODUCTION

This invention relates to error correction techniques for use with memories in a data processing system and, more particularly, to error correction techniques useful with a dynamic random access memory (RAM) array where error detection takes place as part of a memory refresh operation and write back of the corrected data to memory occurs only as a result of such detection.

BACKGROUND OF THE INVENTION

In prior art systems dynamic RAM arrays are provided with an error correction capability and also with the capability of having the information bits stored in the array periodically refreshed. Each bit location on the chip stores digital information in the form of a "one" or a "zero" as represented by the presence or absence of a quantity of charge stored upon the capacitive element forming a bit. Because there is a tendency over time for a charge which is present to be lost, it is necessary to periodically read the information stored at each bit position of a row of a chip and to write the information back into each bit of the row in order to restore the charge to its initial value. This operation, which is termed a refresh operation, is caused to occur sufficiently frequently that the charge corresponding to a zero or a one is maintained at each bit location near the charge levels to which the bit was charged when the one or zero was originally read in.

The refresh procedure is implemented on a row of a chip by providing to the chip a row address and a row address strobe signal. The strobe signal causes the binary information stored at each column position along the addressed row to be read out by amplifiers connected to each column. The column amplifiers write back into bits of the corresponding addressed row the binary information, either a one or a zero, which was originally stored in that row at each column.

Each row of the chip is sequentially refreshed in the same manner by causing the row address to be incremented by one after each refresh procedure. After the last row of the chip has been refreshed the row address is returned to the first row of the chip and the process of refreshing the rows continues. As stated previously the time duration between successive refresh operations is determined by the total number of rows in the chip and the rate at which the stored charge is lost.

In the prior art if, in spite of refresh, an error existed in a word stored in memory, the existence of the error was not determined until such time as that particular word was requested by a requestor, e.g., a central processor unit (CPU) or an input/output (I/O) device. Errors which occur in bit positions of a word are believed to be caused by alpha particles contained in the atmosphere or within the material from which the RAM array is constructed or perhaps from marginal circuit components. Only at the time that a word is read out of memory pursuant to a request by the requestor is the existence of an error in the word ascertained. If such an error existed in a stored word, the error would be corrected before providing the stored word to the requestor, and the corrected word would also be provided to the memory "write" circuitry in order to write the corrected word back into the same word location.

The existence of an error in the word is normally determined by having the memory store extra check bits for each word from which an error in any one of the word bits could be determined. The prior art system has several disadvantages.

One disadvantage is that the requestor may not request a word from a particular location in the memory for a relatively long period of time, the period of time being sufficient that the selected word may experience an error in more than one bit. Thus, a word may not be called from memory for perhaps as long a time as an hour, thereby creating an unnecessarily high probability of an uncorrectable double bit error in that word location before correction would be attempted. Typical error correction techniques have a characteristic that they are capable of correcting single bit errors but if multiple bit errors occur in the word prior to correction of the first bit, the error correction circuitry will detect the presence of multi-bit errors but will be incapable of correcting the multi-bit error condition and the data processing system will incur a malfunction.

There is also a further disadvantage generated by the frequent request for a word from memory where the error may be a "hard" error, i.e., an error which cannot be corrected in memory by writing back the corrected word via the error correction circuitry. A hard error may occur because of a malfunction of a circuit component or, perhaps, a defective bit in memory (e.g., a "stuck-at-zero" or a "stuck-at-one" condition of a bit of memory). In that event, if that word having a hard error is accessed frequently the error correction circuitry will attempt to make a correction into memory each time the word is accessed and will be unsuccessful in making this correction. As a consequence, if a hard error occurs in a word which is frequently accessed, a considerable slowdown in the operation of the machine will occur because of the time required for each error correction attempted.

BRIEF SUMMARY OF THE INVENTION

In accordance with the invention every word in the memory is caused to be read, and single bit errors are corrected in all words, if necessary, sufficiently frequently so that the statistical probability of having more than one error occur in any one word in the interval between successive reading and error corrections tends to be negligible. Thus, the location of a word in which an error may occur tends to be random with only a very small probability of two bits in any one word being in error in the time interval between one reading of the word, and error correction of an error in the word if necessary and the next reading and correction of the error therein if necessary. The reading and error correction process (sometimes hereinafter called a "sniff" or "sniffing" operation) occurs in the invention at a predetermined time interval which is a function of the refresh period and the number of words contained in the memory. The rate of occurrence of bit errors in the memory is such that the probability of a non-correctable double-bit (or higher multiple-bit) error in any word occurring between the time that any word is sniffed is negligible. The predetermined time interval places a limit on the amount of time that is spent in trying to correct a hard error.

For the particular implementation of the preferred embodiment to be described herein, the interval between sniffing any one word in memory is two seconds.

However, substantially greater time periods would be suitable, such as would occur when using a larger memory, with only a slight increase in the probability of a double-bit or higher multiple-bit error.

Thus, in accordance with the invention the correction of a word in memory which has a single bit in error will only occur when the word has been periodically read out and error detected (a sniffing operation) at a time interval which has already been assigned as the time required to refresh the words in the memory. Therefore, as mentioned above, a limit is placed on the time lost in trying to correct an error in a memory word even though there is hard single-bit error which is uncorrectable. In the system of the invention, when a word is requested from memory by the requestor, the word is checked to determine whether or not it has an error and corrected, if necessary, before being supplied to the requestor; however, there is no attempt at that time to correct the error in that word of memory. As stated previously the error in that word will be detected subsequently at the time it is selectively read out of memory during the time that the sniff of that word of memory is being implemented. During the refresh operation the stored words in the memory are selectively read out sequentially and the detection of errors therein (or sniffing) occurs at substantially the same time that a refresh of bits occurs in the same row as the sniffed words. Any single bit errors are then corrected so that a periodic correction of errors in all of the words stored in the memory occurs. It is, therefore, a feature of this invention that a continuous checking for (detection of) single bit errors in the memory takes place during the refresh operation and such detection operation does not require additional machine time over that which is already necessary for the refresh operation of the dynamic RAM memory array. Error correction, when necessary, then takes place at a fixed frequency, a limit thereby being placed on the error correction process, as discussed above.

A memory comprising banks of dynamic RAM's is controlled by a "bank controller" unit which periodically and sequentially provides a refresh signal to each corresponding row of the dynamic RAM chips of the memory. At the time during which the refresh signal is being applied to the memory, the bank controller unit also provides a read signal to only one word of the entire memory. This word is read out by the read signal and corrected, if necessary. The corrected word is written back into that same word position in memory during the time period that the bank controller continues to address the word which was read out.

More specifically, in a particular embodiment having 16K dynamic RAM chips that typically are used in the memory of the invention, each bit thereof should be refreshed once every two milliseconds (msec.) according to typical RAM chip specifications. The RAM chips have bits arranged to form 128 rows and 128 columns. Since the bit storage element for each bit of the RAM chip is essentially a capacitor of limited storage time, the charge stored at each bit must be periodically restored (refreshed) at each bit position sufficiently frequently to maintain the change at each bit to preserve the ONE or ZERO state being stored at each bit location as charge storage. In order to provide the restoration of charge to the bits of a RAM, a row address strobe (RAS) signal is applied to all the bits of an addressed row of all the chips of the memory simultaneously. The row address of the RAS signal is incremented to the next row and a RAS signal is repeated every 15 microseconds ($\mu$sec.). Since there are 128 rows in each RAM chip, each row (and each bit of the chip) becomes refreshed every 1920 $\mu$secs., or approximately 2 milliseconds.

After the assertion of the RAS signal is started, but before the end of the assertion thereof, a column address strobe (CAS) signal is applied to only one column of all the chips forming a memory plane. The RAS and CAS signals overlap and the assertions thereof cause a read out of the stored bit at the location corresponding to the row and column addresses of the strobe signals applied to each chip of the memory plane. Typically a memory plane comprises 39 of the chips, a corresponding bit position of 32 chips providing the bits of a word and a corresponding bit position of 7 chips providing the check bits used in conjunction with the 32 bits for error correction of any one of the 39 bits. Thus each word in memory comprises corresponding bits of each of the 39 chips, and the overlapping application of RAS and CAS signals to each chip reads out a word at the selected column and row address.

DESCRIPTION OF THE INVENTION

The invention can be better understood with the help of the accompanying drawings wherein.

Figure 1:
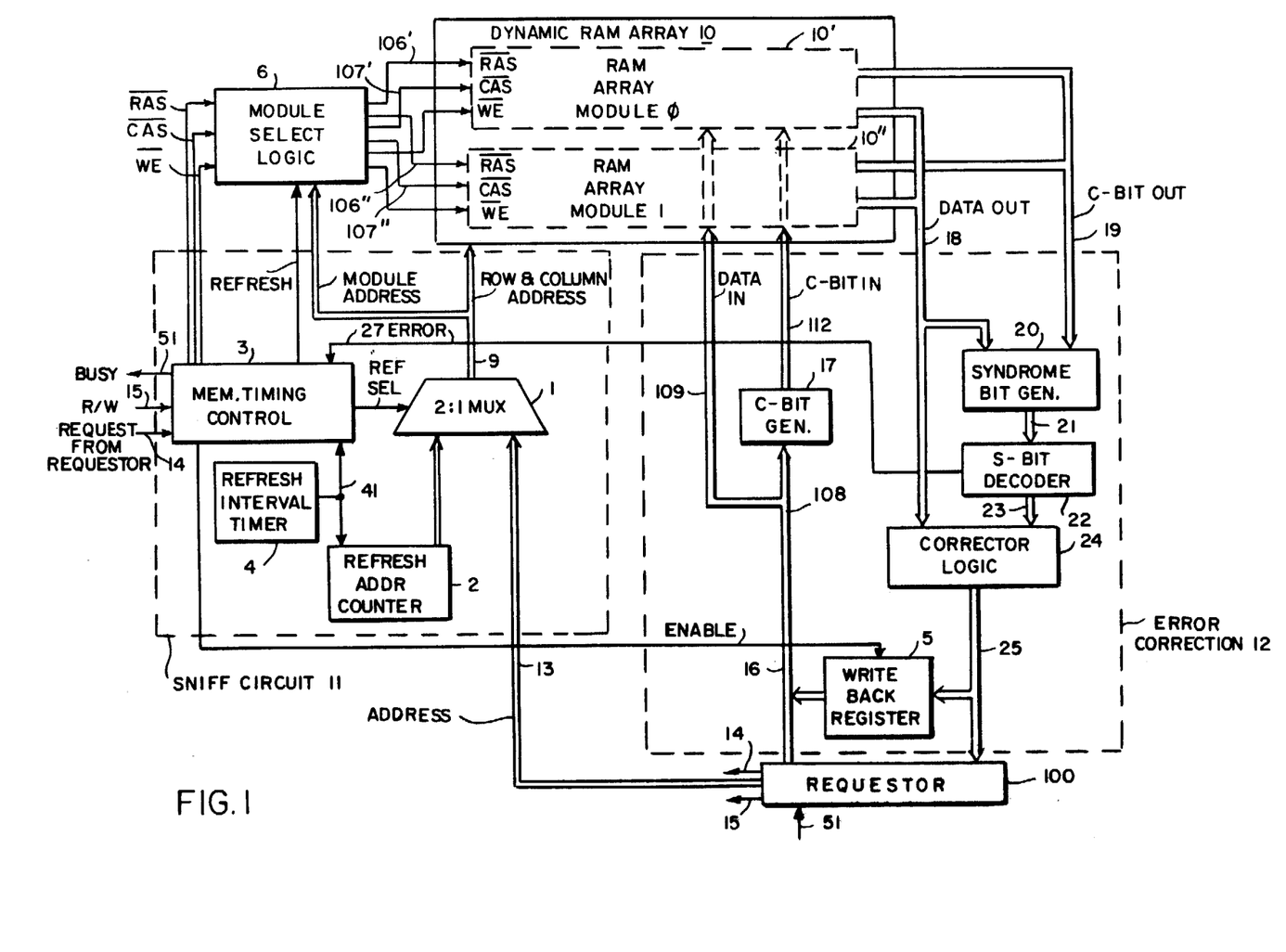
FIG. 1 shows a block diagram of an embodiment of the invention.

FIG. 1 is a block diagram of an embodiment of the invention which demonstrates its operation. A dynamic RAM memory array 10 comprises conventional RAM chips, typically referred to as MOSTEK, type MK 4116 chips. Each chip is a 16,384 by 1 bit dynamic RAM having 128 rows and 128 columns of bits. For purposes of illustrating the invention it will be considered that two modules, module 0 and module 1, constitute the dynamic RAM array 10. Each module has 39 dynamic RAM chips arranged so that corresponding bit positions of the chips provide 32 bits constituting the bits of a word and 7 bits constituting check bits (C bits). The dynamic RAM array 10 has an address input provided from a two-to-one multiplexer (MUX) 1 which has one address input provided by the requestor 100, which may be a central processor unit or an input/output device. The other address input to the multiplexer 1 is provided by the refresh address counter 2. A control signal, the refresh select signal (REF SEL), is applied to the 2:1 MUX 1 to control which of these two addresses is being presented to the dynamic memory array 10.

The digital address signal provided on line 9 to the dynamic memory array 10 comprises a row address as the least significant seven digits of the digital signal, a column address as the next least significant seven digits of the digital signal, with the most significant digital position of the address signal being used to select the module of the dynamic RAM memory 10, in this case either module 0 or module 1. In other embodiments of the present invention more than two modules can be used, e.g., if eight modules are utilized in the memory array 10, the most significant bits of the address signal would require 3 bits for selection of one module out of the eight modules.

The memory timing control unit 3 provides the signals which control access to the dynamic RAM array 10 by the requestor 100 and by the sniff circuit 11 and error correction circuit 12. Among the control signals provided by the memory timing control unit 3 are the refresh select (REF SEL) signal which as stated previously controls the 2:1 MUX 1 to determine whether the address provided to the dynamic RAM array 10 is the address provided by the requestor 100 or is the address provided by the sniff circuit 11. Further control signals are provided according to the function to be performed within the dynamic RAM array 10. For example, memory timing control unit 3 also provides a row address strobe (RAS) signal, a column address strobe (CAS) signal, a refresh (REFRESH) signal, and a WRITE ENABLE (WE) signal. In addition the memory timing control unit 3 provides to the error correction logic 12 an ENABLE SIGNAL to a write back register 5 and a BUSY SIGNAL to the requestor 100. A read/write (R/W) signal and a REQUEST signal are both provided to the memory timing control unit by the requestor 100.

The memory timing control unit 3 is actuated either by a REQUEST signal from the requestor or by the input 41 from the refresh interval timer unit 4. The refresh interval timer 4 provides a clock interval (in a particular embodiment of the invention a clock pulse may occur every 15 microseconds). The output of timer 4 acts as a pulse signal both to initiate the memory timing control unit 3 and to increment the refresh address counter 2.

The preceding multiplexer 1, refresh address counter 2, and memory timing control 3, and refresh interval timer 4, constitute major components of the sniff circuit 11.

Another portion of the implementation of this embodiment of the invention is the error correction circuitry 12. When the address is received by the 2:1 MUX 1 from the requestor 100 on line 13, there is also provided a request signal from the requestor 100 into the memory timing control unit 3, together with a signal on the read/write line 15 which, it will be assumed, indicates that a write into memory is desired by the requestor. The requestor also provides a 32-bit data word to the error correction logic circuitry 12 on data bus 16. The 32 bits of word information provided by the requestor on data bus 16 are fed directly into the data input of the dynamic RAM array 10. Data bus 16 also goes to C-bit (check bit) generator 17 for the generation of 7 "C" bits that are appended to the data word and stored at the same address as the data word in the memory array 10. (A 32-bit data word with single error correction and double error detection requires 32 bits of data and 7 bits of C-bits).

If it is assumed instead that the requestor has requested a read out of a word of data from memory 10 by a READ signal on line 15, output data will be provided on bus 18 as 32 bits of word data and on bus 19 as 7 bits of check bit data. The data on buses 18 and 19 is provided to the syndrome bit (S-bit) generator 20 which provides a 7-bit output having 32 different possible bit patterns to indicate a particular single bit error in the data word. Another seven of the bit patterns are provided by the S-bit generator 20 to indicate a particular check bit in error, while other bit patterns indicate the presence of multiple bit errors. There is a unique pattern which indicates that there is no error.

The 7 bits on bus 21 are provided to the S-bit decoder 22 which in turn provides an indication on its output bus 23 as to which of the 39 memory bits is in error. The output bus 23 may assume the form of 32 lines, each one of which is capable of inverting one bit. The output 23 of the S-bit decoder 22 and the 32 bits of the word on bus 18 are provided as inputs to corrector logic circuit 24 which in its relatively simple implementation may assume the form of "Exclusive-OR" gates. The decoding bus 23 from the S-bit decoder 22 will indicate which one, if any, of the word bits is in error, with the corrector logic circuit 24 correcting that error and providing at its output on data bus 25 the corrected 32 bit word of data to the requestor 100. The error detection and correcting apparatus is conventional and well known to those skilled in the art. A typical system has been described in U.S. Pat. No. 4,005,405, incorporated herein by reference, which describes in detail the components of the error correction circuitry 12.

It has been assumed that upon the request for a read out from memory 10 from the requestor 100 that there has been a single bit error which has been corrected by correction circuitry 12. It should be noted that, on the read out of the data on the data bus 25 to the requestor 100, there is no write back into the memory on data bus 16 through write back register 5 which is under the control of the ENABLE signal on line 200 from the memory timing control unit 3. Thus, on a read out of a word by the requestor 100, the word read out is corrected if necessary and transmitted to the requestor without expending time to write back the corrected data into the memory as in prior art systems.

The operation of the sniff circuit 11 is most readily understood by considering first that portion of the circuit 11 which corresponds to conventional refresh circuitry. The refresh interval timer 4 provides a pulse train with a period between pulses determined by the number of rows in each RAM circuit chip and the manufacturer's recommended time between refresh pulses applied to any given row of the chip, as explained earlier. As stated previously, for a Type 4116 RAM chip, each row of the chip should be refreshed approximately every 2 milliseconds which time period, when divided by the 128 rows in the chip, provides a 15 $\mu$sec. period for the pulses provided by refresh interval timer 4. Therefore, every 15 microseconds the refresh interval timer 4 provides a pulse to the refresh address counter 2 to increment it by one and also provides a signal to the memory timing control unit 3 to indicate that a refresh cycle should be generated by the memory timing control at the next available opportunity.

The memory timing control unit 3, if not already occupied with a request from requestor 100, in response to a pulse from the refresh interval timer 4 provides an output signal "Refresh Select" (REF SEL) to the multiplexer 1 and also provides a BUSY signal on line 51 to the requestor 100 to indicate to the requestor that a delay will occur before data from the requestor is to be processed, i.e., either accessed in a read operation or accepted in a write operation. If, as in the prior art, only a refresh was to take place, the refresh address counter 2 need only have as many bits as are required to provide the binary number corresponding to the maximum number of rows in the RAM chips. In the case being considered, since there are 128 rows in each chip the refresh address counter would require only 7 bits if only a refresh operation were being provided.

However, in the present invention it is necessary to also provide column address information to the memory array. Therefore, the refresh addresss counter 2 provides seven additional more significant bits which are used to provide the column address and one additional bit to distinguish between the modules. Thus, the address being used in the operation of sniff circuit 11 is a full address, just as the address from the requestor is a full address (the row and column address plus the module select information) since the full address is required to select a particular word in the dynamic RAM array. In the memory array of FIG. 1, for example, the full address requires seven additional bits for the column address and only one additional, more significant bit which designates either module 0 or module 1 as the selected module in which a sniff, or read, operation is to take place.

Thus, in the improved apparatus of this invention, each time the memory timing control unit 3 calls for a refresh cycle, a full address instead of merely a row address, as in the prior art, is provided to the dynamic RAM array. What is desired in the sniffing operation is that a corresponding row of all the RAM chips in each module of the memory array be refreshed at the same time, but that only one word of the refreshed rows of all the modules be read out.

After counting through all 128 rows of the chips, the address counter 2 repeats the process through the rows but at a different column location, the column address being incremented by one when all 128 rows of the chips have been addressed. Sequencing of the modules also occurs when the module identification bit is incremented by one by the refresh address counter 2. After incrementing the module address by one, the word positions in the second module are read out, while the rows of all the chips in both modules are being refreshed in sequence according to the row addresses as previously described.

The full address from the refresh address counter 2 is provided to the 2:1 MUX 1. If the memory timing control unit 3 is in the refresh cycle it provides an output signal refresh select (REF SEL) to the 2:1 MUX 1 which causes the output address on line 9 at the 2:1 MUX 1 to be the full address of the refresh address counter 2. The most significant bit of the refresh address on line 9 is provided to the module select logic 6. The module select logic 6 is shown to have three inputs, a RAS, a CAS and a WRITE ENABLE signal provided by the memory timing control unit 3 in addition to a REFRESH signal also provided by the memory timing control unit.

The corresponding row of each RAM chip in both module 0 and module 1 requires that a signal be applied thereto which is capable of refreshing that row. In addition it is desired that one column of all the RAM chips of one of the RAM array modules 0 or 1 also be provided with signals which cause the word which is stored at the selected row and column position to be read out from the memory array in order that it be provided to the error correction circuitry 12 where the presence or absence of an error in the word at that particular location would be determined. If an error is detected, the S-bit decoder 22 of the error correction circuitry 12 provides an error signal on line 27 to the memory timing control unit 3. The presence of the error signal causes the memory timing control to provide an ENABLE signal on line 200 which will cause the write back register 5 to place the corrected word on the bus and generates the appropriate RAS and CAS signals to write back the correct word at the same memory location at which the sniff operation occurred. In a heavily pipelined system where a cycle from the requestor may be in process by the time the S-bit decoder has recognized that an error exists in the sniff word, the memory timing control will wait until the request by the requestor has been executed and then repeat the sniff operation at the previous sniff address and will block further requests from the requestor 100 until such time as the word at the sniff address has been read, corrected if necessary, and rewritten into the sniffed location in the memory.

As stated previously, it is desired that a corresponding row of all the chips of all the modules in the dynamic RAM array 10 be refreshed at the same time. Referring to the block diagram of FIG. 1, this objective is accomplished by causing the refresh row address portion of the complete address provided on line 9 by the 2:1 MUX 1 to be provided to each chip of both modules of the RAM array 10 during a refresh operation. The REFRESH signal is provided along with the address to the chips in order to allow the row address strobe RAS signal provided as an input to the module select logic 6 to be applied to all of the chips in each module of the array 10. The application of the RAS signal to each chip of both modules causes each of the bits within the addressed row of each of the chips to be refreshed by causing each bit to regenerate the "1" or the "0" that was originally stored in that bit position. Thus, the same address, as well as the RAS signal, is applied to all modules during a refresh operation but only the selected module has the CAS and WE control signals applied to it so that only the selected module is either written into or read out from. During normal read or write operations, while the same address is applied to all modules, the RAS, CAS, and WE signals are applied to the selected module.

The refresh column address is also provided to the dynamic RAM array 10 but the module select logic 6 allows the column address strobe CAS to be applied only to the module which has a module address corresponding to the module portion of the refresh address on line 9 (in any access to memory, the CAS goes only to one module). In the embodiment shown in FIG. 1, since there are only two modules, module 0 and module 1, the module select bit is either a 1 or a 0. The column address strobe (CAS) signal causes the 39-bit word which is stored at the row and column address of the addressed module to read out the 32 bits of data on line 18 and the 7 C-bits on line 19 for error detection of the data word and correction, if necessary, as explained earlier.

Referring to the memory timing control unit 3, it is seen that a BUSY signal on line 51 is applied to the requestor 100 in order to delay a read or write request from the requestor until the refresh cycle has been completed. In a similar manner, if a request for a read or write from the requestor 100 has been received on line 14 by the memory timing control unit 3, the refresh cycle will be delayed until the read or write request on line 15 from the requestor has been completed.

In the event that a read out on the sniff cycle causes a word to be read out from the selected module which is determined to have an error in one bit, an ERROR signal provided on line 27 to the memory timing control unit 3 will cause the memory timing control unit to generate the appropriate combination of signals to write the corrected data back into memory (a write back operation). These signals include RAS, CAS, REF SEL (to select the refresh module address), a write enable signal (WE) and an ENABLE signal to the write back register 5. The REF SEL signal causes the same refresh row and column address to be applied to the chips. The write back register ENABLE signal causes the corrected data to be placed onto the bus 16 and the write enable (WE) signal causes the data to be written into the address location, if necessary, rather than to be read, as in the refresh access operation. It has been assumed that the address of the word read out is not changed by the time that write back of the corrected word occurs, so that the REF SEL signal selects the same row and column address.

The write enable (WE) signal is the same WE signal which is generated in a normal write operation as a result of a write command from request 100, the WE signal being provided in conjunction with the row, column and module address provided by the requestor, together with RAS, CAS, AND MOD SEL, all of which causes new information to be written into the memory location specified by the row, column, and module address provided by the requestor. Absence of a WE signal causes these signals to provide only a readout of the word at the selected address.

The preceding explanation of the invention has disclosed the basic operations involved in error correction by the sniffing technique. In systems using pipelined information transfer in the memory system, the implementation becomes somewhat more complex but the basic system operation described above remains essentially unchanged. In the pipelined system the refresh logic remains much the same as previously presented except that the requestor and sniffing addresses are provided to a block of words in each module instead of to a single word in a module. Each block consists of four words which, in the particular implementation of this invention, are read out sequentially, one word every 110 nanoseconds. Also the error correction circuitry is very similar to that previously presented for a single word except that it must be slightly modified in order to handle the four consecutive words of the block which come through the error correcting unit as a group since words are written into and read out of the dynamic RAM array 10 as blocks of words rather than as single words.

Figure 2:
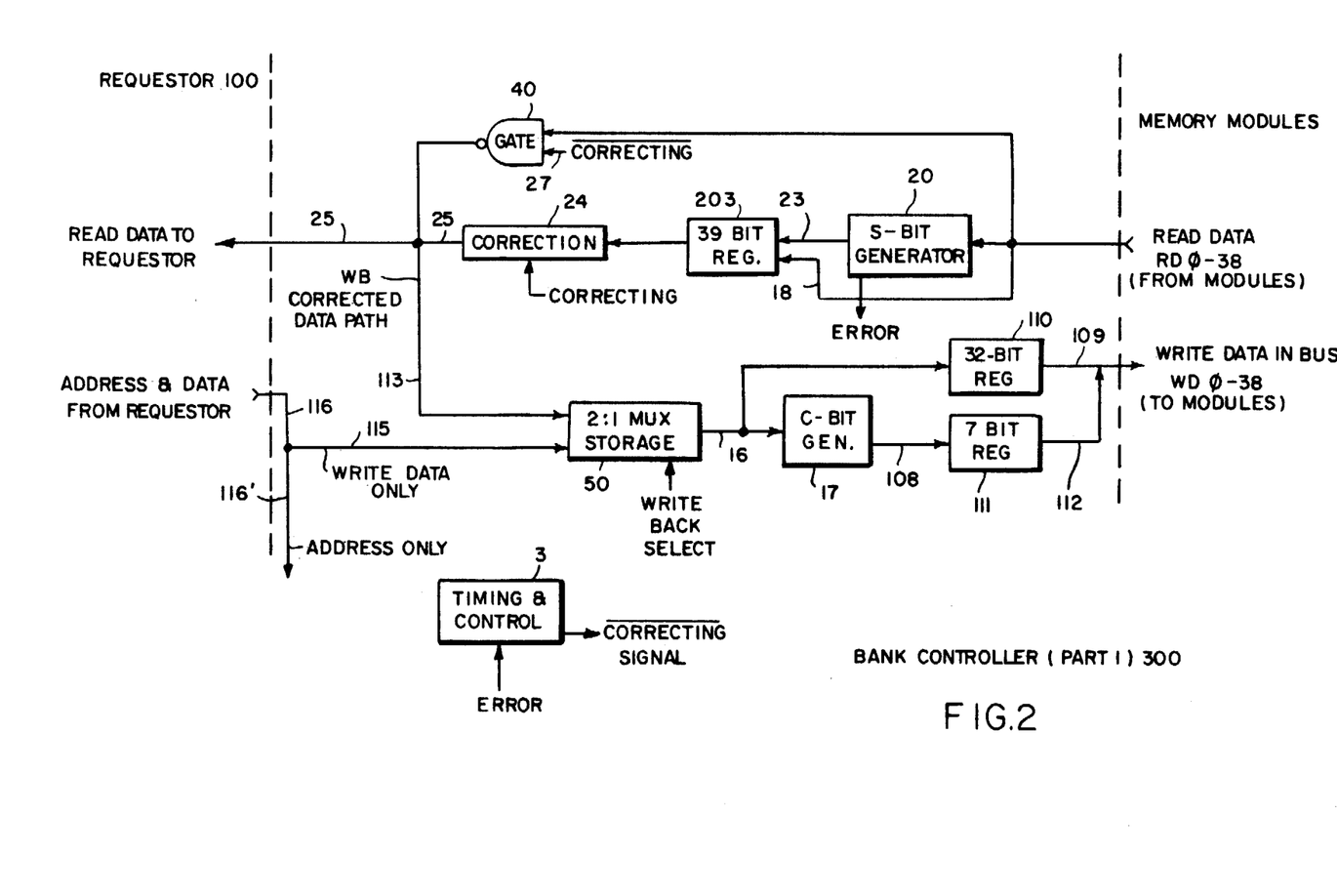
FIGS. 2 and 3 show block diagrams of a portion of a second embodiment of the invention.
Figure 3:
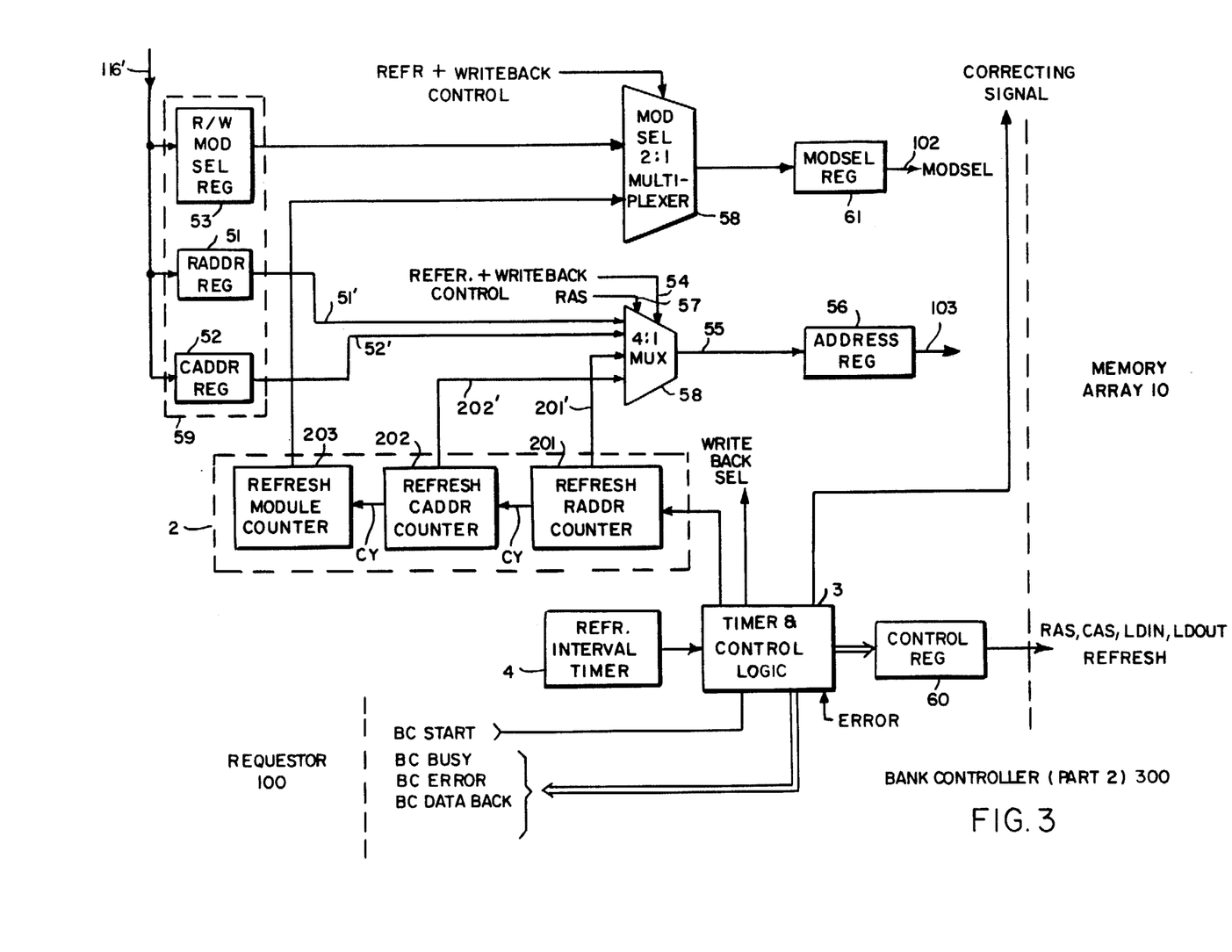
Figure 4:
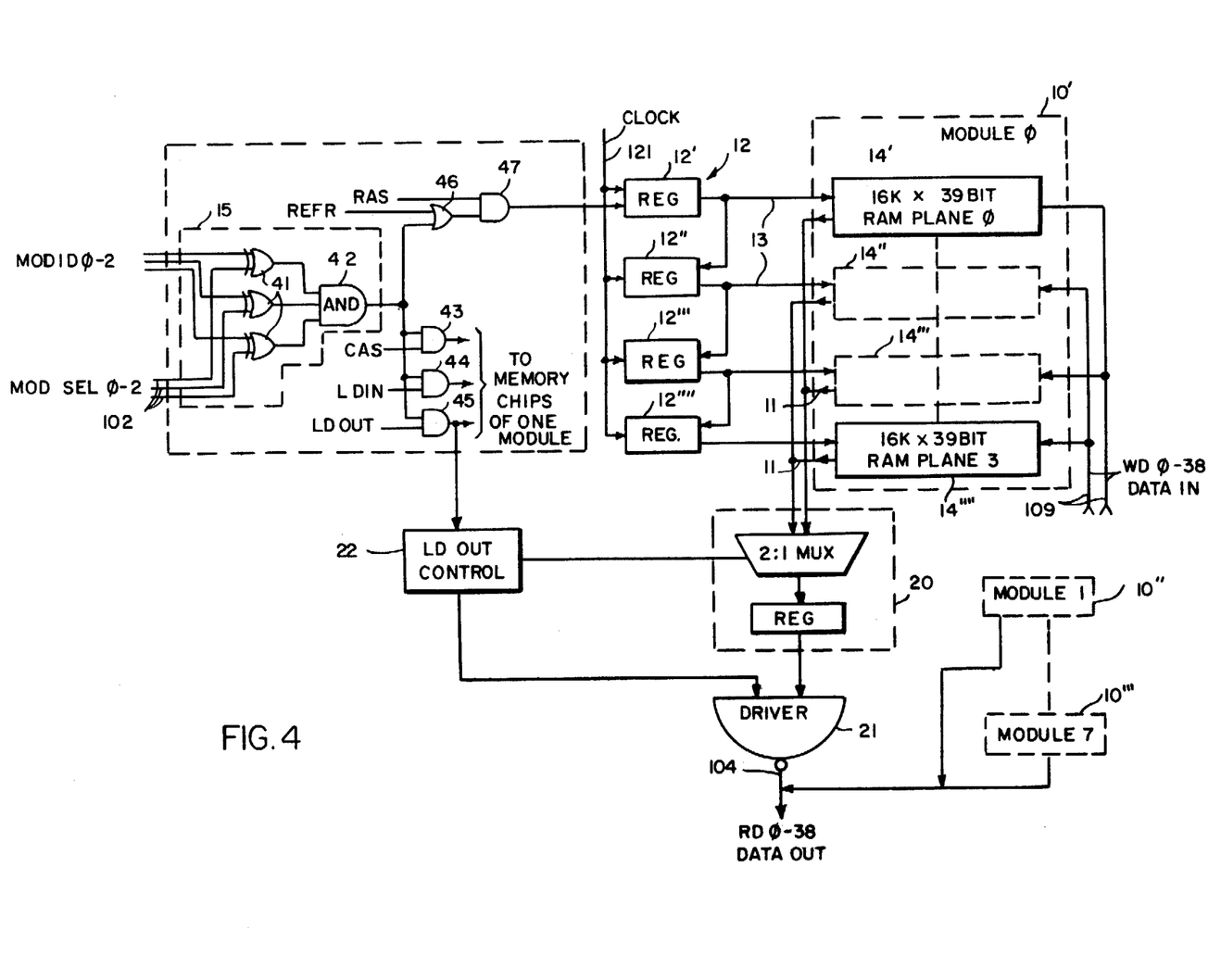
FIG. 4 shows a block diagram of another portion of the second embodiment of the invention.

Referring to FIGS. 2 and 3, the block diagrams therein represent a bank controller unit 300 which controls the transfer of word blocks between a requestor and a memory array, including control of the sniffing operation. The address and data words from a requestor 100 are supplied to the bank controller 300 on the same bus 116. The data word on line 115 is presented to the 2:1 storage multiplexer 50 the output of which is supplied to a check bit (C-bit) generator 17. The output of the 2:1 storage multiplexer 50 is also provided as an input to incoming 32-bit write data register 110, the output of which is supplied to a write data output bus and into the data input line 109 of the dynamic RAM array 10 as shown in FIG. 4. The output 108 of the C-bit generator 17 is provided through a 7-bit register 111 to output line 112 to the data in bus of the dynamic RAM array 10 of FIG. 4 as bits WD 32–38. The read data (RD 0-38) is returned from the memory and supplied to S-bit generator 20, the 7-bit output of which is provided on line 23 as one input to 39-bit storage register 203 and provides an ERROR signal to timing and control logic 3 if an error exists. The other input to the register 203 is the 32-bit (RD 0-31) from the memory. The 39-bit output of register 203 is provided to the correction logic circuit 24 which includes the S-bit decoding logic. Correction logic 24 is gated by the CORRECTING signal to provide a corrected word on its output line 25 if the state of CORRECTING signal is such as to indicate that there was an error in the originally read word. In the absence of an error, a CORRECTING signal is applied to gate 40 to cause the word read from memory to be supplied directly to output line 25.

Pipelining of the four words of a block of words from memory introduces the need for the register 203 when a correction is required. When a correction is required the CORRECTING signal is not present and open collector gate 40 is not operative, while the assertion of the correcting signals causes correction circuit 24 to operate. Both gate 40 and the output of correction circuit 24 are open collector drivers so that their outputs may be directly connected to the output line 25. For the purpose of writing back corrected data, correction circuit 24 is also connected as one input 113 to 2:1 storage multiplexer 50 which incorporates the function of the write back register 5 of FIG. 1. The 2:1 storage multiplexer 50 thus can select either the write data from the requestor on line 115 or the corrected data from memory on line 113 to be applied to the C-bit generator 17 and from there back into the memory. The 32-bit register 110 for the write data and the 7-bit register 111 for the C-bit data provide the temporary storage for proper timing of this data for write back into memory.

Referring to the block diagrams of FIGS. 2 and 3 it is seen that the requestor 100 provides on line 116 in a time-multiplexed manner both the address information and also the data to be written into the memory. The address information is directed along a branch 116' of line 116 to the address register 59. The address register 59 comprises a row address register 51, a column address register 52 and a module select register 53.

The 4:1 multiplexer 54 is used to select between the requestor's row and column addresses provided by the address register 59 on lines 51', 52', respectively, and the refresh row and column addresses provided by the refresh address counter 2 on lines 202', 201', respectively. The REFRESH + WRITEBACK CONTROL signal selects either the refresh address counter 2 or the requestor address register 59 as the source of both the row and column addresses. The application of the signal RAS to MUX 53 first causes the selected row address and then the selected column address to be sequentially applied to address register 56 before being applied to the memory 10. Sequential addressing is required since each chip of the memory has only seven address lines for specifying both the row and column addresses. The chip has the capability of separating the row and column addresses based on the timing of the RAS and CAS signals. (FIG. 1 did not show the multiplexing of the row and claim addresses for simplicity, but the operation thereof can also be time-multiplexed in the same way).

In a similar fashion, the REFRESH+WRITEBACK CONTROL signal is applied to module select MUX 58 to select either the module address of the requestor address register 59 or the module address of the refresh address counter 2. Three bits of address at the output to the 2:1 module select multiplexer 58 are used to select one of a plurality of 8 modules of a memory array 10 which can be used, for example, in a preferred embodiment of the invention, as shown in FIG. 4. The three bits are provided to MOD SEL register 61 where they are stored for correct timing purposes before being applied to the module select circuit 15 shown in FIG. 4 which selects one of the eight modules for activation by other control signals to permit either the reading out or writing into thereof.

FIG. 3 shows in detail the refresh address counter 2 which comprises the refresh row address counter 201, the refresh column address counter 202, and the refresh module counter 203. The carry (CY) output of the refresh row address counter 201 clocks the refresh column address counter 202 whose carry (CY) output in turn clocks the refresh module counter 203.

As stated previously, the refresh interval timer 4 determines the intervals at which the dynamic RAM array memory is refreshed and sniffed. The output signal of timer 4 is provided as an input to the timing and control logic 3 to provide a signal to increment the refresh address counter 2. The timing and control logic 3 also produces a plurality of signals, each on its own line, that go into a control register 60. These signals are row address strobe (RAS), column address strobe (CAS), load in (LD IN), load out (LD OUT), and refresh (REFRESH), each of which signal outputs from register 60 is provided on its own line as control signals to the dynamic RAM array 10 shown in FIG. 4.

The requestor interface signal that starts an access request from the requestor to the bank controller is the BC START signal which is applied to the timing and control logic 3. It is seen that the timing and control logic circuit 3 is actuated by either a signal from the refresh interval timer 4 or by the BC START signal from the requestor.

The requestor interface signals from the bank controller to the requestor are the bank controller BUSY signal (BC BUSY), the bank controller error signal (BC ERROR), and the bank controller data back signal (BC DATA BACK). The BC DATA BACK signal indicates to the requestor that the requested data is ready and will be sent to the requestor. The BC ERROR signal indicates to the requestor that a delay of one cycle will occur before the next word of the requested data is sent because of the delay which occurs due to the correction operation, and the BC BUSY signal indicates that the bank controller cannot accept data from the requestor either because it is in a refresh cycle or it is busy because of a previous request start.

When a word is detected to have an error during the sniff operation, the circuitry is designed to introduce a slight delay, required because of the pipelining of information in the system, to cause the timing control unit 3 to provide the control signals required to do a complete read/modify write operation at that same word position which had just previously been determined to be in error. During the read/modify write cycle, the word that was previously read and found to be in error during the sniff cycle is again read, corrected as necessary, and immediately read back into memory.

When a word is read out of memory into the bank controller on a request by the requestor 100 and an error is detected, the word is corrected in the bank controller error correction circuitry but is not written back into the memory. When that same word is read out during the sniff cycle, it is checked again for an error and, if an error is detected, the corrected word is written back into memory.

The memory system in the configuration of FIGS. 2–4 can be operated as basically a pipeline system, i.e., a system in which a number of accesses in various stages of completion are in progress at any one time. The system also provides for block oriented access, i.e., a block of two or more consecutive words, e.g., four words in the embodiment discussed here, are accessed, so that by the time the final word of a block is actually checked for error correction the system is well into the next access request.

The refresh operation is also arranged to operate in the same pipelined fashion as the access operation, so as to provide a reasonable amount of refresh overlap. By the time an error has been detected in a particular word, such word is no longer involved in the access operation. Since the memory chips themselves are then involved in a subsequent access operation, the original access operation cannot be completed with corrected data. Accordingly, a "flag" is set to indicate that an error has been detected, which error should be corrected in memory. At a later time (typically a few microseconds later) the word is read again, because the data which needs to be corrected may have been modified in the meanwhile, and the correct data is generated and written back in one operation. Thus, any change in the data stored at that word position between the time that an error is first detected and the time that the error can be corrected does not produce a further error.

In a particular embodiment, for example, a time duration of 15 microseconds occurs between REFRESH signals, each refresh cycle requiring 550 nsecs. as in a normal access operation. If an error is detected during the sniff operation, the word is accessed again during the 15 microseconds between refresh signals and it is at that time that the error is corrected. The refresh address counter 2 of FIG. 1 (or counter 201 of FIG. 3) contains the address which specifies the block of words which are going to be sniffed and, if an error is found, a few microseconds later the error is corrected. The counter 2 (or counter 201) is not updated until just before the next refresh cycle. Thus, the correct address is present at the time that the corrected word is reaccessed for correction and is written back into the memory.

The sniffing operation is, in effect, a reading out of one sequentially and periodically accessed word location. A refresh (REFR) signal (at gate 46 of FIG. 4) overrides the module comparison signal so that even though only one module is being read, all of the modules are activated to perform that portion of a read cycle which is required for a refresh operation. Thus, the sniffing operation effects a refresh operation over and above a normal read operation. Since the operation in FIGS. 2–4 is a block read (i.e., four consecutive words are read), one word is read from each plane of a module at intervals of 110 nanoseconds per word. A sniff operation is in effect a read of a word location in each plane at 110 nanoseconds intervals. Therefore, instead of selecting only one module and reading only that module, as in a conventional read, during the sniffing operation one module is selected and read, a portion of the read operation (not including the actual reading out of the data) is also performed on the chips of all other modules, because the REFRESH signal is asserted to do a refresh on all rows corresponding to the particular row that is being read in the one module that is being sniffed.

Referring to FIG. 4, four planes 0–3 are present in each module with the inputs and outputs of planes 0 and 2 tied together and inputs and outputs of planes 1 and 3 tied together, as shown. Control signals on line 13 are also shown being supplied to each plane. Such control signals are supplied to the planes 14 in sequence, a 110 nanosecond clock signal being provided to each register 12 on line 121' for the RAS control signal and similarly to other registers (not shown) for the other address and control signals. The control signals and address supplied to plane ∅ are thereupon supplied to a second register 12' for the RAS control signal and a similar second register for each of the other address and control signals (for plane 1) 110 nanoseconds later, and so on, through each of the four planes.

The module select signal 102 from the bank controller 300 as shown in FIG. 3 indicates which module is intended to be accessed. The module selection signal is appropriately gated with control signals from the bank controller (e.g., the RAS, CAS, LD IN, LD OUT). The REFR signal is also gated with the RAS control signal from the bank controller so that the RAS signal and only the RAS signal is provided to all of the modules when a refresh (REFR) signal is asserted. The module selection comparison is thereupon overridden when REFR is asserted, so as to supply an RAS signal, but not a CAS signal, to perform the refresh operation (such refresh only operation will not result in the supplying of any data). Data can be taken out from the module on line 11 through a multiplexer-register 20 to driver 21 which is enabled by a control signal from LD OUT controller 22 that is in turn controlled by the module comparison circuit. Thus, there is no RD ∅-38 data out from any module which is not being read, per se, but is only being refreshed. Any module that is being read is not interfered with in any way by the fact that the refresh operation has activated the other modules for refresh purposes.

The read data input line to the bank controller (RD ∅-38) is connected to the read data output line of the memory module. The refresh operation is essentially the same as a normal read operation except that the REFR control signal is asserted along with the MODSEL signal. In a first time portion of the refresh operation, the control signals supplied include the RAS and MODSEL signals while the address line 103 is providing the row address. In the subsequent time portion, other control signals (CAS, LD OUT) are supplied, all of the signals being on independent lines.

As mentioned above, the timing is arranged so that the control signals are applied to each of the planes ∅-1 of a module in sequence, i.e., when the control signals for the initial time period are supplied to plane 1 the control signals for the subsequent time period are being supplied to plane ∅, and so on. Finally, because the planes are accessed one after the other, data which is returned from each of the planes is returned in 110 nsecs. intervals.

On FIG. 4 a sequence, or cascade, of registers 12 are shown which present the RAS signal to the planes ∅-3 of a module in sequence separated in time by 110 nanoseconds. Although not shown in FIG. 1, as mentioned above, a similar cascade of registers is also necessary for each of the control signals CAS, LD IN, LD OUT, as well as the row and column addresses provided to each module, such registers being used for the sequencing of such signals to each plane. The module select circuitry 15 is provided on each module with a different module identification signal MOD ID ∅-2 provided to each module select circuitry 15.

The signal LOAD OUT is used in reading data out from memory and controls the MUX/Register 20 and the driver 21 which puts the output data on the data bus 104. The driver 21 is such that when it is not putting data on bus 104, it is in a high impedance state so that any other driver of a different module which is enabled by the load out control unit 22 by its LOAD OUT signal may drive bus 104.

The LOAD IN signal is used in the interface circuitry to cause the enabling of the registers that provide input data on line 109 (such latching is not specifically shown in FIG. 4). More importantly, the LOAD IN signal is used to provide the WE signal which transfers the data in the data in latch register with the RAM's.

The embodiment shown and discussed here with reference to FIGS. 2-4 can be used, for example, in a system such as that described in the following United States Patent Applications filed on the same day as this application and entitled as follows:

(1) Data Processing System, Ser. No. 143,561 filed by E. Rasala, S. Wallach, C. Alsing, K. Holberger, C. Holland, T. West, J. Guyer, R. Coyle, M. Ziegler and M. Druke;

(2) Data Processing System Having a Unique Address Translation Unit, Ser. No. 143,681 filed by S. Wallach, K. Holberger, S. Staudaner and C. Henry;

(3) Data Processing System Utilizing a Hierarchical Memory Storage System, Ser. No. 143,981, filed by W. Wallach, K. Holberger, D. Keating and S. Staudaner;

(4) Data Processing System Having a Unique Memory System, Ser. No. 143,974, filed by M. Ziegler and M. Druke;

(5) Data Processing System Having a Unique Instruction Processor System, Ser. No. 143,651, filed by K. Holberger, J. Veres, M. Ziegler and C. Henry;

(6) Data Processing System Having a Unique Microsequencing System, Ser. No. 143,710, filed by C. Holland, K. Holberger, D. Epstein, P. Reilly and J. Rosen;

(7) Data Processing System Having Unique Instruction Responsive Means, Ser. No. 143,982, filed by C. Holland, S. Wallach and C. Alsing.

The above applications each have the same specifications which is incorporated by reference herein and describes an overall system which uses a memory system of the type discussed herein. Such applications include specific logic circuitry for implementing the memory system therein which logic circuitry is perforce incorporated by reference herein.

What is claimed is:

1. In a data processing system having a memory in which binary words, each comprising a plurality of bits, are stored:

refresh means connected to said memory for periodically refreshing the bits of one or more stored words at a selected refresh time interval;

error detection means connected to said memory for detecting an error which may exist in at least one binary bit of one of said one or more stored words the detection thereof being performed at substantially the same time as the refreshing of said one or more stored words;

a single error correcting means connected to said error detection means and responsive to the detection of an error in said one of said one or more stored words for correcting said error when said error has been detected during said refresh operation; and means connected to said error correcting means and to said memory for writing said corrected word back into said memory.

2. In a data processing system in accordance with claim 1 and further including:

means responsive to a request from a requestor for accessing a stored word in said memory;

said error detecting means is responsive to said accessing means and is further capable of detecting an error in at least one binary bit of said requested stored word at substantially the same time said stored word is requested for access by said requestor;

said single error correcting means is further capable of correcting an error in said stored word which has been so requested for access; and means responsive to said corrected word from said error correcting means for supplying said corrected word to said requestor, the uncorrected word remaining in said memory until corrected at a subsequent refresh operation.

3. In a data processing system in accordance with claims 1 or 2 wherein said memory comprises a plurality of memory modules in which said words are stored, the binary bits thereof being located at selectable rows and columns in each said memory module; and further wherein said refresh means includes:

module select means for providing during a refresh operation a module select signal for selecting a specified memory module in which a word is to be refreshed;

row select means for providing during a refresh operation a row select signal to all of said memory modules identifying a specified row in each of said modules; and column select means for providing during a refresh operation a column address select signal only to said specified module selected for said refresh operation identifying a specified column in said selected module.

4. In a data processing system in accordance with claim 3 wherein:

said column select means provides said column address select signal only to the module specified by said module select signal when a requestor requests that a word be read out from or written into said memory; and said row select means provides said row address select signal only to the module specified by said module select signal when a requestor requests that a word be read out from or written into said memory.

5. In a data processing system in accordance with claim 4 further including:

means for providing a write enable signal only to the module specified by said module select signal when a corrected word is written back into said memory during a refresh operation or when a requestor requests that a word be written into said memory.

6. In a data processing system in accordance with claim 5 wherein each said memory module includes means for supplying a busy signal when a refresh operation is occurring with respect to the words stored in said module to prevent a requestor from accessing said module during said refresh operation.

* * * * *